United States Patent [19]
Vahlstrom et al.

[11] 3,777,262
[45] Dec. 4, 1973

[54] PULSE AMPLITUDE VARIATION DETECTOR

[75] Inventors: Richard E. Vahlstrom, Villa Park; Donald C. Nutten, Newport Beach; Dennis R. Bayne, Placentia; Stanley Oster, Anaheim, all of Calif.

[73] Assignee: Northrop Corporation, Los Angeles, Calif.

[22] Filed: June 7, 1971

[21] Appl. No.: 150,273

[52] U.S. Cl.............................. 324/103 P, 329/109
[51] Int. Cl............................................. G01r 19/16
[58] Field of Search..................... 324/103 P, 103 R, 324/102; 329/109; 328/151

[56] References Cited
UNITED STATES PATENTS

| 3,659,211 | 4/1972 | Norton | 328/151 |
|---|---|---|---|
| 2,519,295 | 8/1950 | Shepard, Jr. | 329/109 |
| 3,593,132 | 7/1971 | Houck | 324/102 |

Primary Examiner—Rudolph V. Rolinec
Assistant Examiner—Ernest F. Karlsen
Attorney—William W. Rundle and Willard M. Graham

[57] ABSTRACT

A long term hold circuit accepts a train of input pulses having amplitude variation "jitter" thereon, and feeds simultaneously into an averager and an AC amplifier, the AC amplifier feeding simultaneously into another averager and a peak-to-peak detector.

4 Claims, 4 Drawing Figures

INVENTORS:
Richard E. Vahlstrom
Donald C. Nutten
Dennis R. Bayne
Stanley Oster
By William W. Rundle
AGENT

PULSE AMPLITUDE VARIATION DETECTOR

The present invention relates to waveform analyzers, and more particularly, to a pulse parameter jitter detector for detecting the time or amplitude variation on the parameters of a pulse train. "Jitter" in this Specification is defined as amplitude variation.

In order for a waveform analyzer system to be complete, for example, it should have the capability of detecting parametric variations on a pulse-to-pulse basis. An object of the present invention is to provide such a detector of "jitter" as it is called herein.

Briefly, our invention comprises a long duration hold circuit for accepting the input pulses, means for providing the average amplitude of the input pulses, means for providing the average AC value of the amplitude variations of the pulses, and means for providing the peak-to-peak value of this amplitude variation component, the latter three means operatively connected to the output of the long duration hold circuit. Automatic reset is provided to the hold circuit. In a preferred embodiment, amplification is provided for the average "jitter" and peak-to-peak "jitter" outputs.

This invention will be more fully understood by reference to the following description of apparatus and to the accompanying drawings, wherein.

Figure 1:
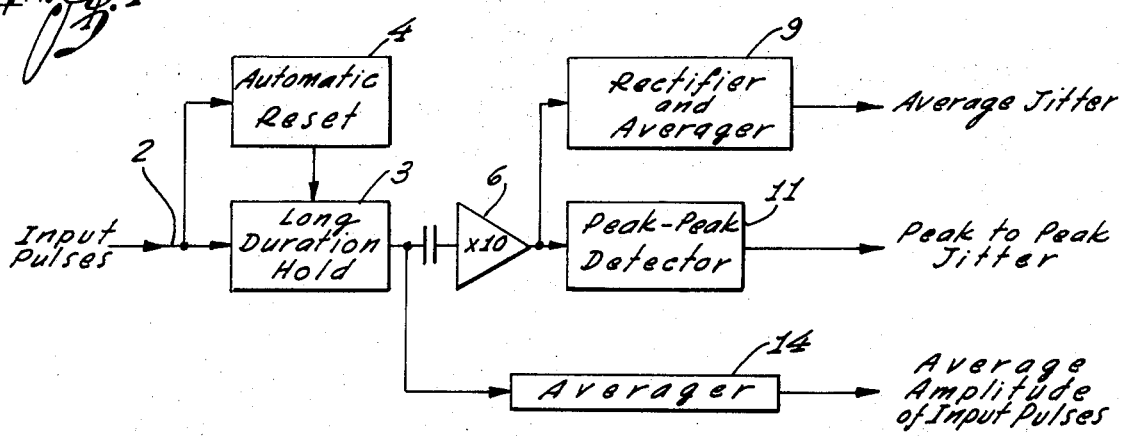
FIG. 1 is a block diagram of the present invention.
Figure 2:
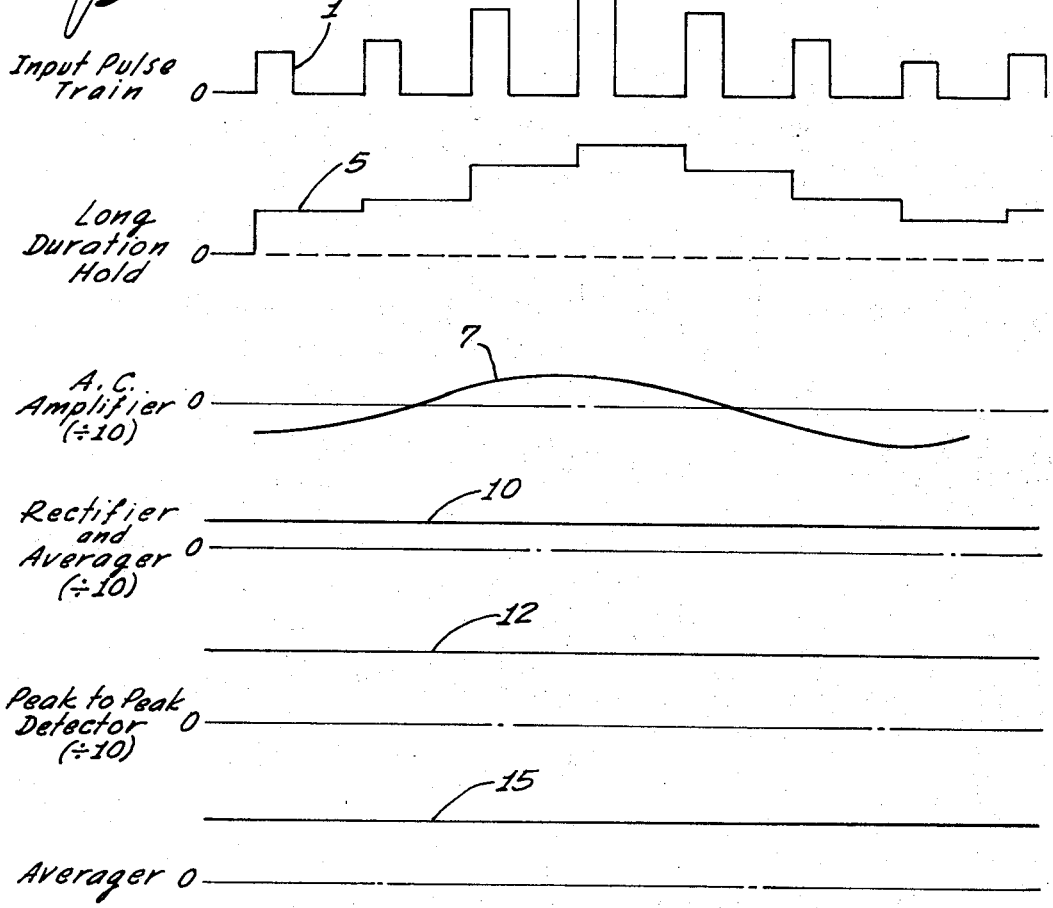
FIG. 2 is a group of waveforms showing typical signals derived by the present invention.
Figure 4:
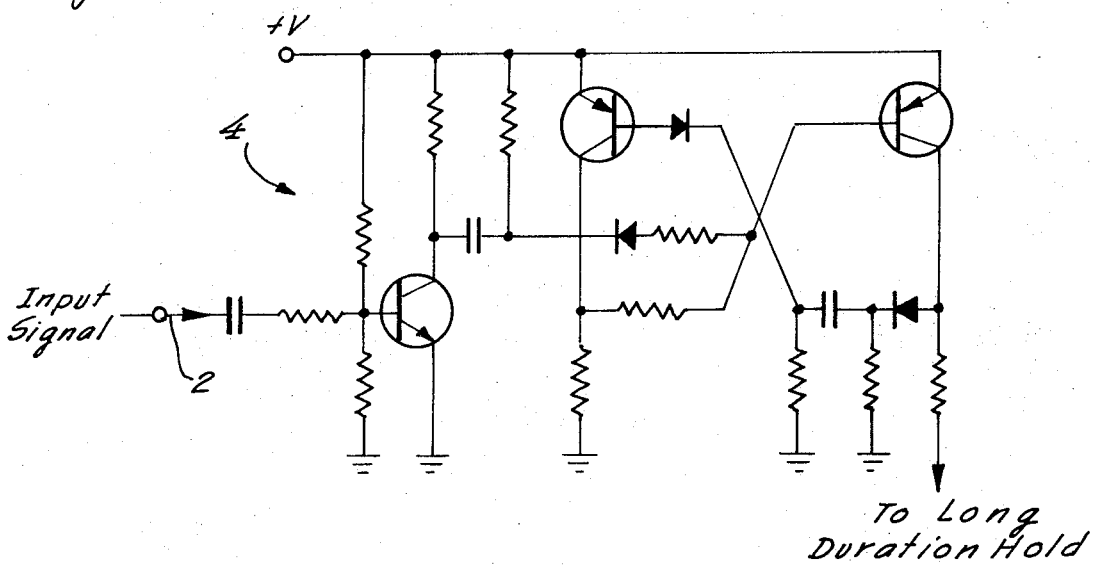
FIG. 4 is a schematic diagram showing details of an automatic reset circuit.
Figure 3:
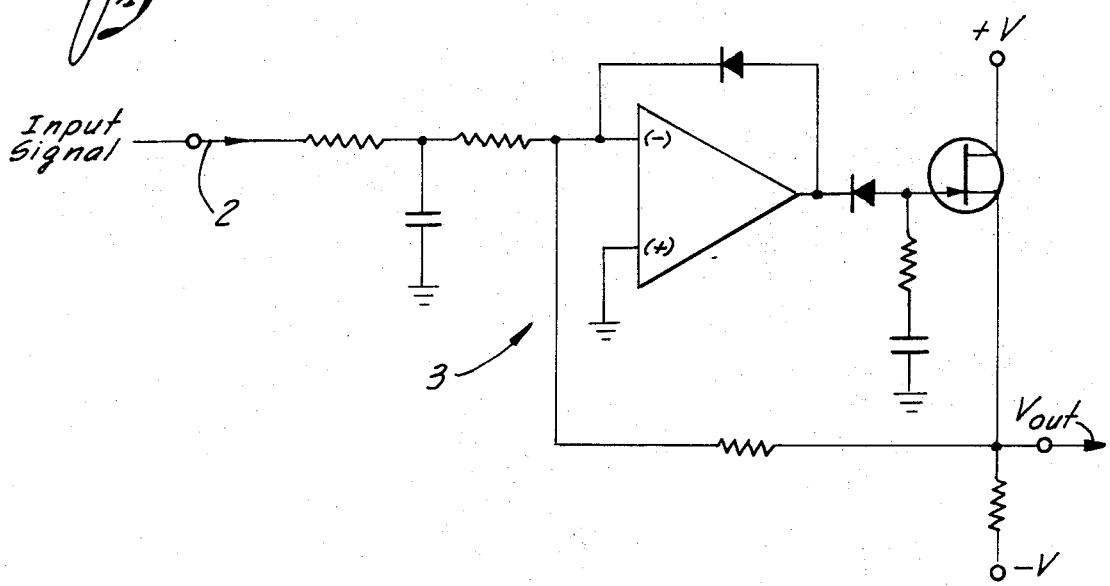
FIG. 3 is a schematic diagram of a long duration hold circuit for use in this invention.

Referring to FIGS. 1 and 2, an example of a train of pulses 1 appears on an input line 2 to a long duration hold circuit 3. These pulses may be from a time interval detector or a peak level detector, for example. A suitable long term hold circuit 3 is shown in FIG. 3. The time constant of this circuit should be such that the amplitude decay is negligible. Hold circuit 3 is automatically reset at the leading edge of each incoming signal by a reset circuit 4, which may be as shown in FIG. 4. Thus the output of the hold circuit is the staircase waveform 5.

The output of the hold circuit 3 is capacitively coupled to an AC amplifier 6 which has as its output the curve 7. This output is precisely full-wave rectified by a rectifier and averager 9 to give a signal representing the average amplitude variation voltage as shown by the waveform line 10. Also the output of amplifier 6 is fed to a peak-to-peak detector 11 which has as its output the peak-to-peak amplitude variation value 12 shown in FIG. 2.

The output of the long duration hold 3 is also directly coupled to an averaging circuit 14 from which the average amplitude 15 of the input pulses is obtained.

As can be seen, this system provides three different outputs all of which represent some aspect of the amplitude modulating waveform or jitter. The amplifier 6 may not be necessary in some systems but is preferable. If no amplification of the "jitter" is desired, there must still be an AC coupling to the rectifier and averager 9 and to the peak-to-peak detector 11 to remove the DC component of the signal. By use of this amplitude variation detector in conjunction with a waveform analyzer, for example, it is possible to determine if there is any information carried on the parameters of an incoming pulse train, or if there are any error signals present on transmitted pulse train.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. A pulse amplitude variation detector for receiving a train of input pulses, comprising: a long duration hold circuit for holding the amplitude of an input pulse thereto with negligible decay, automatic reset means connected to the train of input pulses and to said long duration hold circuit for resetting said hold circuit with each input pulse to the magnitude of each said input pulse, first means connected to the output of said hold circuit for indicating the average AC amplitude variation component on said input pulses, and second means connected to said hold circuit output for indicating the peak-to-peak value of amplitude variation component of said pulses.

2. Apparatus in accordance with claim 1 wherein said first means comprises an AC amplifier capacitively connected to said hold circuit output, and a rectifier connected to the output of said AC amplifier.

3. Apparatus in accordance with claim 1 wherein said first means comprises an AC amplifier AC-coupled to said hold circuit output, and a rectifier and averager connected to the output of said AC amplifier.

4. Apparatus in accordance with claim 1 wherein said second means comprises an AC amplifier capacitively connected to said hold circuit output, and a peak-to-peak detector connected to the output of said AC amplifier.

* * * * *